US010941261B2

(12) United States Patent
Kim et al.

(10) Patent No.: US 10,941,261 B2
(45) Date of Patent: Mar. 9, 2021

(54) POLYALKYLENE CARBONATE-BASED RESIN FILM

(71) Applicant: LG CHEM, LTD., Seoul (KR)

(72) Inventors: Hyun Min Kim, Daejeon (KR); Hyun Ju Cho, Daejeon (KR); Sung-Kyoung Kim, Daejeon (KR); Seung Young Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 19 days.

(21) Appl. No.: 16/347,506

(22) PCT Filed: Dec. 27, 2017

(86) PCT No.: PCT/KR2017/015580
§ 371 (c)(1),
(2) Date: May 3, 2019

(87) PCT Pub. No.: WO2018/124746
PCT Pub. Date: Jul. 5, 2018

(65) Prior Publication Data
US 2020/0056003 A1 Feb. 20, 2020

(30) Foreign Application Priority Data

Dec. 27, 2016 (KR) .................. 10-2016-0180486
Dec. 26, 2017 (KR) .................. 10-2017-0180266

(51) Int. Cl.
*C08J 5/18* (2006.01)
*C08L 69/00* (2006.01)
*C08L 73/00* (2006.01)

(52) U.S. Cl.
CPC .............. *C08J 5/18* (2013.01); *C08L 69/00* (2013.01); *C08L 73/00* (2013.01); *C08J 2369/00* (2013.01); *C08J 2473/00* (2013.01)

(58) Field of Classification Search
None
See application file for complete search history.

(56) References Cited

U.S. PATENT DOCUMENTS

| 4,303,759 A | * | 12/1981 | Dixon | C08K 5/005 |
| | | | | 524/167 |
| 4,880,908 A | * | 11/1989 | Lutz | C08L 73/00 |
| | | | | 525/468 |
| 6,121,374 A | | 9/2000 | Montanari et al. | |
| 6,310,220 B1 | | 10/2001 | Schmitter et al. | |
| 2003/0013821 A1 | | 1/2003 | Tan et al. | |
| 2007/0134411 A1 | | 6/2007 | Cont et al. | |
| 2008/0274360 A1 | | 11/2008 | Gallucci | |
| 2009/0065730 A1 | * | 3/2009 | Yoshino | C08L 71/02 |
| | | | | 252/62.2 |
| 2009/0236565 A1 | | 9/2009 | Mercx et al. | |
| 2016/0145431 A1 | | 5/2016 | Cho et al. | |
| 2016/0222209 A1 | | 8/2016 | Jung | |
| 2019/0300702 A1 | * | 10/2019 | Park | C08L 61/02 |

FOREIGN PATENT DOCUMENTS

| CN | 1041606 A | 4/1990 |
| CN | 1386130 A | 12/2003 |
| CN | 101365739 A | 2/2009 |
| CN | 101802092 A | 8/2010 |
| CN | 101878272 A | 11/2010 |
| CN | 105051108 A | 11/2015 |
| CN | 106589882 A | 4/2017 |
| FR | 2760460 B1 | 9/2003 |
| JP | 10-1601 A | 1/1998 |
| JP | 2001-272400 A | 10/2001 |
| JP | 2002-114899 A | 4/2002 |
| JP | 2016-530391 A | 9/2016 |
| KR | 10-0340611 B1 | 10/2002 |
| KR | 10-2008-0092355 A | 10/2008 |
| KR | 10-2010-0016205 A | 2/2010 |
| KR | 10-2010-0075861 A | 7/2010 |
| KR | 10-1098242 B1 | 12/2011 |
| KR | 10-2014-0039804 A | 4/2014 |
| KR | 10-2014-0070706 A | 6/2014 |
| KR | 10-2016-0003616 A | 1/2016 |
| KR | 10-2016-0059900 A | 5/2016 |
| KR | 10-2016-0108062 A | 9/2016 |
| KR | 10-2017-0062561 A | 6/2017 |
| KR | 10-2018-0076350 A | 7/2018 |
| KR | 10-2018-0076352 A | 7/2018 |
| WO | 2016-072642 A2 | 5/2016 |
| WO | WO2018182328 | * 10/2018 |
| WO | WO2018212488 | * 11/2018 |

OTHER PUBLICATIONS

Acemoglu, et al. 1997. Poly(ethylene carbonate)s, part I: Syntheses and Structural Effects on Biodegradation. Journal of Controlled Release. vol. 49. pp. 263-276.

Inoue, et al. 1969. Copolymerization of Carbon Dioxide and Epoxide. Polymer Letters. vol. 7. pp. 287-292.

* cited by examiner

Primary Examiner — David J Buttner
(74) Attorney, Agent, or Firm — Dentons US LLP

(57) ABSTRACT

The disclosed relates to a polyalkylene carbonate-based resin film. More specifically, the present disclosure relates to a polyalkylene carbonate resin-based film comprising a blend resin in which a polyalkylene carbonate resin and a polyketone resin are mixed in a specified amount, thereby ensuring both excellent tensile strength and tear strength without deteriorating elongation properties possessed by the polyalkylene carbonate resin.

12 Claims, 2 Drawing Sheets

POLYALKYLENE CARBONATE-BASED RESIN FILM

CROSS-REFERENCE TO RELATED APPLICATION(S)

This application is a National Stage Application of International Application No. PCT/KR2017/015580, file don Dec. 27, 2017, which claims priority to and the benefits of Korean Patent Application Nos. 10-2016-0180486, filed on Dec. 27, 2016, and 10-2017-0180266, filed on Dec. 26, 2017, with the Korean Intellectual Property Office, the disclosures of which are incorporated herein by reference in their entireties.

TECHNICAL FIELD

The present invention relates to a polyalkylene carbonate-based resin film comprising a polyalkylene carbonate-based resin in which physical properties of a polyalkylene carbonate resin have been complemented.

BACKGROUND ART

Plastics are used as materials for various articles due to their ease of manufacture and convenience of use, and for example, they are used in various fields such as disposable articles such as packaging films, disposable cups and disposable dishes, as well as b ding materials and automobile interior materials.

In particular, a polyalkylene carbonate resin has an advantage that due to its high oxygen barrier property and high elongation property, it can be used for various applications such as food packaging and industrial protective films.

However, the polyalkylene carbonate resin has a problem that a tensile strength relatively low compared to a high elongation property, and thus a blend resin in which a resin having excellent tensile strength (for example, polylactic acid) is mixed for improving a tensile strength is used.

In the case of such blend resin, the tensile strength can be improved by an additional resin, but to that extent, the elongation property of the polyalkylene carbonate is deteriorated, and the tear strength (split strength) is also decreased. Especially, in the case of an industrial protective film, workability is significantly deteriorated if torn at the time of packaging, and it torn after packaging, scratches are generated on the products during transportation. Therefore, a film having excellent tear strength even while having high tensile strength and elongation is required.

On the other hand, in the case where two kinds of polymers are mixed and used, compatibility between both polymers should be good in order to complement each other's physical properties. Compatibility means that when two polymers are mixed, the two polymers are uniformly mixed or dispersed. If the compatibility is decreased, physical properties of each polymer are expressed intactly, and thus each other's physical properties cannot be complemented. Therefore, various studies have been made on resins having excellent compatibility with polyalkylene carbonate while exhibiting the above mentioned physical properties.

In order to complement physical properties of polyalkylene carbonate, Korean Patent Laid-open Publication No. 10-2014-0070706 discloses the use of a lactide copolymer which includes at least two block copolymer repeating units in which a hard segment of polylactide repeating units is combined at both terminal ends of a soft segment of polyether polyol repeating units, wherein the block copolymer repeating units are connected to each other via an urethane linking group derived from a polyhydric isocyanate compound. However, this method has to produce a copolymer having a novel structure, and is problematic in that the cost is increased compared to the use of polylactic acid.

PRIOR ART LITERATURE

Patent Literature

Korean Patent Laid-open Publication No. 10-2014-0070706

DETAILED DESCRIPTION OF THE INVENTION

Technical Problem

The present invention relates to a polyalkylene carbonate film comprising a polyalkylene carbonate resin having improved mechanical properties.

Technical Solution

In order to achieve the above object, one aspect of the present invention provides a polyalkylene carbonate-based film comprising a blend resin in which 75 to 99% by weight of a polyalkylene carbonate resin and 1 to 25% by weight of a polyketone resin are mixed, wherein the film has a tensile strength of 200 kgf/cm$^2$ to 300 kgf/cm$^2$ as measured by ASTM D 638.

In the present invention, the blend resin may be prepared by mixing 80 to 90% by weight of a polyalkylene carbonate resin and 10 to 20% by weight of a polyketone resin.

In addition, the polyalkylene carbonate resin may include a repeating unit represented by the following Chemical Formula 1.

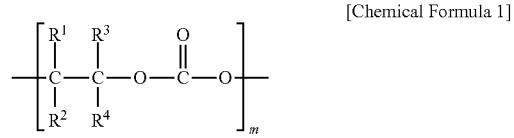

[Chemical Formula 1]

in Chemical Formula 1, $R^1$ to $R^4$ are each independently hydrogen, a linear or branched alkyl group having 1 to 20 carbon atoms, an aryl group having 6 to 20 carbon atoms, an alkenyl group having 2 to 20 carbon atoms or a cycloalkyl group having 3 to 20 carbon atoms, at least two of $R^1$ to $R^4$ may be connected to each other to form a cycloalkyl group having 3 to 10 carbon atoms, and m is an integer of 10 to 1,000.

Specifically, the polyalkylene carbonate resin may be at least one selected from the group consisting of a polyethylene carbonate resin, a polypropylene carbonate resin, a polypentene carbonate resin, a polyhexene carbonate resin, a polyoctene carbonate resin, a polycyclohexene carbonate resin, and a copolymer resin thereof.

In addition, the polyalkylene carbonate resin may have a weight average molecular weight of 50,000 g/mol to 500,000 g/mol.

Further, the polyketone resin may include a repeating unit represented by the following Chemical Formula 2:

[Chemical Formula 2]

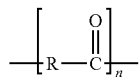

in Chemical Formula 2,

R is a linear or branched alkylene having 1 to 10 carbon atoms; an arylene having 6 to 30 carbon atoms; an alkyl ether having 1 to 10 carbon atoms; an aryl ether having 6 to 30 carbon atoms; an alkyl ester having 1 to 10 carbon atoms; or an aryl ester having 6 to 30 carbon atoms, and n is an integer of 10 to 1,000.

Specifically, the polyketone resin may be an aliphatic polyketone resin containing ethylene, propylene, isopropylene, or butylene units.

Further, the polyketone resin may be a binary copolymer or a ternary copolymer.

The polyketone resin may have a weight average molecular weight of 10,000 to 1,000,000 g/mol.

The polyketone resin may have a melt index (MI) of 3 to 8.

According to one embodiment of the present invention, an internal tearing strength of the polyalkylene carbonate-based film according to ASTM D 1004-03 may be 50 kg/cm to 80 kg/cm.

According to another embodiment of the present invention, an elongation of the polyalkylene carbonate-based film according to ASTM D 638 may be 300% to 500%.

Advantageous Effects

According to the polyalkylene carbonate-based film of the present invention, as the blend resin in which the polyalkylene carbonate resin and the polyketone resin are mixed in a specific amount is included, the mechanical properties can be improved simultaneously without deteriorating excellent elongation properties possessed by the polyalkylene carbonate resin.

Further, the polyalkylene carbonate-based resin film of the present invention is excellent in compatibility between the polyalkylene carbonate resin and the polyketone resin without another compatibilizer.

DETAILED DESCRIPTION OF THE EMBODIMENTS

Figure 1:
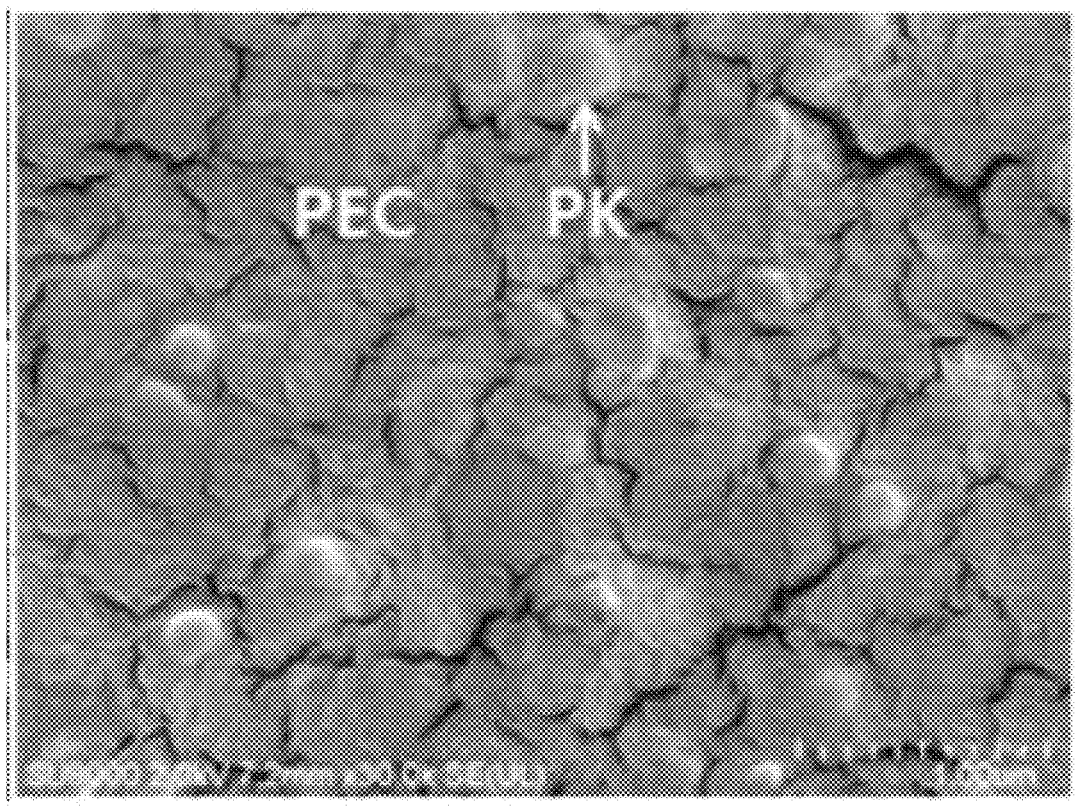
FIG. 1 is a SEM photograph of a film specimen according to Example 1.

Hereinafter, the polyalkylene carbonate-based resin film according to a specific embodiment of the present invention will be described in more detail.

<Polyalkylene Carbonate-Based Resin Film>

Conventionally, despite its excellent physical properties, the polyalkylene carbonate resin has a low glass transition temperature (Tg) of about 20° C. and is fragile at a temperature equal to or lower than Tg, and has difficulty in producing into a film due to soft tackiness at a temperature equal to or higher than Tg. The present inventors have found that by including a blend resin in which the polyalkylene carbonate resin and the polyketone resin are mixed in a specific amount, mechanical properties can be remarkably improved while maintaining the inherent excellent physical properties possessed by the polyalkylene carbonate, thereby completing the present invention.

In addition, as the polyalkylene carbonate resin and the polyketone resin are mixed and used in the above-described specific ratio and their tensile strengths satisfy a specific range, it is excellent in compatibility without a compatibilizer commonly used in a blend resin, and thereby, it does not cause a problem that physical properties of the film are deteriorated due to the compatibilizer.

The polyalkylene carbonate-based resin film according to one embodiment of the present invention comprises a blend resin in which 75 to 99% by weight of a polyalkylene carbonate resin and 1 to 25% by weight of a polyketone resin are mixed, and as each resin is included within the above content range, both elongation properties and mechanical properties can be realized at excellent levels. By satisfying the above content ratio range, the polyalkylene carbonate resin and the polyketone resin are very excellent in compatibility.

Preferably, the blend resin may include 80 to 90% by weight of a polyalkylene carbonate resin and 10 to 20% by weight of a polyketone resin. The above-described effects can be further improved within the above content range.

On the other hand, when the polyalkylene carbonate resin is mixed in a small amount exceeding the content range of 75 to 99% by weight based on the total weight of the blend resin, there may be a problem that the elongation properties are deteriorated. Further, when the polyketone resin is contained in an excessive amount exceeding 1 to 25% by weight based on the total weight of the blend resin, there may be a problem that the tear strength is slightly lowered.

The polyalkylene carbonate-based resin film according to one embodiment of the present invention has a tensile strength of 200 kgf/cm$^2$ to 300 kgf/cm$^2$, preferably 230 kgf/cm$^2$ to 290 kgf/cm$^2$ as measured according to ASTM D 638. By satisfying the above range, the film has excellent processability and is resistant to scratches and external impact even after applied to a product. Therefore, it is applied to an industrial packaging film within the above tensile strength ranges and exhibits excellent physical properties.

When the range of the tensile strength is less than 200 kgf/cm$^2$, handling is difficult, such as breakage or cracking occurs in the processing step of the film. When it exceeds 300 kgf/cm$^2$, there is a problem that the film is difficult to apply to various products.

The polyalkylene carbonate-based resin according to one embodiment of the present invention may have an internal tearing strength according to ASTM D 1004-03 of 50 kg/cm to 80 kg/cm, preferably 60 kg/cm to 70 kg/cm. When the above-mentioned range is satisfied, the film is not easily torn even when it is applied to a product after processing step of the film and completion of the film, which is preferable.

The polyalkylene carbonate-based resin film according to one embodiment of the present invention may have an elongation of 300% to 500%, preferably 350% to 450%, as measured according to ASTM D 638. When the above range is satisfied, the film is excellent in processability and can be applied to various products.

<Blend Resin>

The polyalkylene carbonate-based resin film according to one embodiment of the present invention includes a blend resin in which a polyalkylene carbonate resin and a polyketone resin are mixed.

Polyalkylene Carbonate-Based Resin

The polyalkylene carbonate resin is a noncrystalline polymer. Unlike an aromatic polycarbonate resin, which is a synthetic resin of a similar type, not only the polyalkylene carbonate resin is biodegradable and thermally decomposed at low temperatures, but also it is completely decomposed into carbon dioxide and water and there is no carbon residue. Moreover, the polyalkylene carbonate resin exhibits excellent elongation properties and has an advantage that it can be easily applied to industrial packaging materials.

The polyalkylene carbonate resin may contain a repeating unit represented by the following Chemical Formula 1.

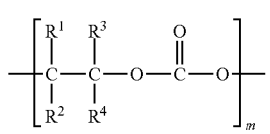

[Chemical Formula 1]

in Chemical Formula 1, $R^1$ to $R^4$ are each independently hydrogen, a linear or branched alkyl group having 1 to 20 carbon atoms, an aryl group having 6 to 20 carbon atoms, an alkenyl group having 2 to 20 carbon atoms or a cycloalkyl group having 3 to 20 carbon atoms; at least two of $R^1$ to $R^4$ may be connected to each other to form a cycloalkyl group having 3 to 10 carbon atoms, and m is an integer of 10 to 1,000.

In the polyalkylene carbonate resin, the decree of polymerization (m) of the repeating unit represented by Chemical Formula 1 may be about 10 to about 1,000, preferably about 50 to about 500. The weight average molecular weight of the polyalkylene carbonate containing the repeating unit may be 50,000 to 500,000, and preferably 10,000 to 100,000. When the above-mentioned range is satisfied, it is mixed with the polyketone resin and can exhibit excellent compatibility, which is preferable.

The polyalkylene carbonate resin may be a homopolymer containing a repeating unit represented by Chemical Formula 1; or a copolymer containing two or more kinds of repeating units belonging to the category of Chemical Formula 1, a copolymer containing an alkylene oxide repeating unit or the like together with the repeating unit represented by Chemical Formula 1.

However, in order to maintain specific physical properties (for example, biodegradability, elongation, flexibility or low glass transition temperature, etc.) caused by the repeating unit represented by Chemical Formula 1, the polyalkylene carbonate resin may be a copolymer containing at least about 40% by weight, preferably at least about 60% by weight, and more preferably at least about 80% by weight of at least one of the repeating units represented by Chemical Formula 1.

The method for preparing the polyalkylene carbonate is not particularly limited, and for example, the polyalkylene carbonate can be obtained by copolymerizing an epoxide-based compound with carbon dioxide. Alternatively, the polyalkylene carbonate can be obtained by a ring-opening polymerization of a cyclic carbonate. The copolymerization of the alkylene oxide and carbon dioxide may be carried out in the presence of a metal complex such as zinc, aluminum or cobalt.

When a polyalkylene carbonate is prepared through copolymerization using an epoxide-based compound and carbon dioxide in the presence of an organic metallic catalyst, the epoxide-based compound may be ethylene oxide, propylene oxide, 1-butene oxide, 2-butene oxide, isobutylene oxide, 1-pentene oxide, 2-pentene oxide, 1-hexene oxide, 1-octene oxide, cyclopentene oxide, cyclohexene oxide, styrene oxide or butadiene monoxide or the like, or alternatively two or more kinds of various epoxide-based compounds selected among them, but the present invention is not limited thereto.

The polyalkylene carbonate resin may be, for example, a polyethylene carbonate resin, a polypropylene carbonate resin, a polypentene carbonate resin, a polyhexene carbonate resin, a polyoctene carbonate resin, a polycyclohexene carbonate resin, or a copolymer resin thereof, but is not limited thereto.

Polyketone Resin

The polyketone resin is a resin which is excellent in mechanical properties and low in moisture absorption, and thus has little dimensional change and little change in physical properties due to moisture absorption. The polyketone resin can be mixed with the above-mentioned polyalkylene carbonate resin within a specific amount range to realize excellent elongation properties and tear strength properties.

The polyketone resin may include a repeating unit represented by Chemical Formula 2.

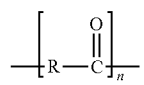

[Chemical Formula 2]

in Chemical Formula 2,

R is a linear or branched alkylene having 1 to carbon atoms; an arylene having 6 to 30 carbon atoms; an alkyl ether having 1 to 10 carbon atoms; an aryl ether having 6 to 30 carbon atoms; an alkyl ester having 1 to 10 carbon atoms; or an aryl ester having 6 to 30 carbon atoms, and n is an integer of 10 to 1,000.

The preparation method of the polyketone resin is not particularly limited, and for example, the polyketone resin is prepared by the reaction of carbon monoxide and a compound containing an unsaturated double bond. Recently, it can be prepared in the form of an alternating copolymer in which repeating units composed of carbon monoxide and at least one or more ethylenically unsaturated hydrocarbon are alternately connected.

The melt index (MI) of the polyketone resin may be 3 to 8, preferably 5 to 7. When the above range is satisfied, compatibility with the polyalkylene carbonate is excellent, and the processing processability of the film can be improved.

It is preferable that the polyketone resin is an aliphatic polyketone containing ethylene, propylene, isopropylene, or butylene units. It is more preferable to use form of a binary copolymer or a ternary copolymer containing at least one of these repeating units.

Further, the polyketone resin may have a weight average molecular weight of about 10,000 to about 1,000,000 g/mol, preferably about. 50,000 to about 500,000 g/mol. When the weight average molecular weight is satisfied, it is preferable from the viewpoint of the processability at the time of production and improvement of mechanical properties of the film. Further, when the above range is satisfied, the polyketone resin can be mixed with the polyalkylene carbonate resin to exhibit excellent compatibility, which is preferable.

According to another embodiment of the present invention, the polyalkylene carbonate resin film may further contain about 1 to about 30 parts by weight of the polylactide resin based on 100 parts by weight of the polyalkylene carbonate resin. When a polylactide resin mixed and used, the thermal stability of the polyalkylene carbonate resin can be improved, and thereby kneading with the polyketone resin can be carried out more stably. When the polylactide resin is contained in an excessively smaller amount than the above range, decomposition of the polyalkylene carbonate may occur at the time of kneading polyketone and polyalkylene carbonate at high temperature. When the polylactide is contained in an excessively large amount than the above range, there may be a problem that the inherent physical properties of the polyalkylene carbonate are deteriorated.

Since the polyalkylene carbonate-based resin film of the present invention includes a polyalkylene carbonate resin, a polyketone resin, and a polylactide resin in a specific ratio, it has less blocking phenomenon during processing and is also excellent in thermal stability, while having excellent mechanical properties. Accordingly, it can be preferably used for a semi-permanent use such as sheets, food packaging films, floor materials, electronic product packages, or automobile interior materials.

Generally, lactides may be classified into L-lactide composed of L-lactic acid, D-lactide composed of D-lactic acid and meso-lactide composed of one L-form and one D-form. Further, a mixture of L-lactide and D-lactide in a ratio of 50:50 is referred to as D,L-lactide or rac-lactide. It is known that, when L-lactide or D-lactide having high optical purity, among these lactides, is polymerized, L- or D-polylactide (PLLA or PDLA) having high stereoregularity is obtained, and that the polylactide obtained in this way is rapidly crystallized and has high crystallinity compared to polylactide having low optical purity. However, in the present specification, the "lactide monomers" is defined as including all types of lactides regardless of the difference in characteristics of lactides according to the types thereof and the difference in characteristics of polylactides derived therefrom.

The molecular structure of the polylactide may be that polymerized from L-lactic acid, D-lactic acid or L,D-lactic acid. The polylactide may be prepared by a process including the step of forming the repeating units described below by the ring-opening polymerization of lactide monomers. The polymer obtained after the completion of the ring-opening polymerization and the repeating unit formation process may be referred to as the polylactide. In this case, the category of lactide monomers may include all types of lactides as described above.

According to one embodiment of the present invention, the polylactide may have the degree of polymerization of preferably about 50 to about 500, and may have a weight average molecular weight of about 10,000 to about 1,000,000 g/mol. As, the polylactide has the above-described degree of polymerization and weight average molecular weight, the polyalkylene cabonate resin composition may maintain the inherent physical properties of the polyalkylene carbonate, and obtain excellent thermal stability effect even during processing at a high temperature.

The category of the polymer that can be referred to as "polylactide" may include all the polymers obtained after the completion of the ring-opening polymerization and the repeating unit formation process, for example, unpurified or purified polymers obtained after the completion of the ring-opening polymerization, polymers included in a liquid or solid resin composition before the formation of a product, polymers included in plastic or textile after the formation of a product, and the like.

As methods of preparing a polylactide, a method of directly polycondensing lactic acid and a method of ring-opening polymerizing lactide monomers in the presence of an organic metal catalyst are known. The method of ring-opening polymerizing lactide monomers is complicated and needs high cost compared to the polycondensation be lactide monomers must be first prepared from lactic acid, but a polylactide resin having a relatively large molecular weight can be easily obtained by the ring-opening polymerization of lactide monomers using a or metal catalyst, and the polymerization rate thereof can be easily adjusted. Therefore, this method is commercially widely available.

The polyalkylene carbonate-based resin film according to the present invention includes a blend resin having the above-mentioned composition, and the mixing method of the blend resin can be used without particular limitation as long as it is a method commonly used in the art. Specifically, mixing can be carried out by a Henzel mixer, a ribbon blender, a blender or the like to thereby obtain a uniform mixture. Further, as the melt kneading method, a VAN Antonie Louis Barye mixer, a single-screw compressor, a twin-screw compressor or the like can be used.

As the method for preparing a polyalkylene carbonate-based resin film according to the present invention, methods commonly used in the art can be used without particular limitation. Specifically, the blend resin can be prepared into a film through injection molding, compression molding, injection-compression molding, gas injection molding, roam injection molding, inflation, T-die, calendar, blow molding, vacuum molding, extrusion molding, and the like. Preferably, it can be prepared into a film according to T-die method.

The thickness of the polyalkylene carbonate-based resin film according to the present invention is not particularly limited, and may be suitably selected in the range required to maintain the elongation properties and mechanical properties described above.

Preferably, it may have a thickness of 0.1 μm to 1,000 μm, or a thickness of 1 μm to 100 μm, more preferably 5 μm to 50 μm.

Since the polyalkylene carbonate-based resin film according to the present invention contains a blend resin of the above-mentioned components and has a specific physical property value, it can realize excellent mechanical properties without deteriorating elongation properties. Therefore, the production processability of the film is excellent, and scratches, breakage or cracks do not occur after application of the product, and thus can be advantageously applied to industrial packaging materials.

Hereinafter, the function and effect of the present invention will be described in more detail by way of specific examples of the invention. However, these examples are set forth to illustrate the invention, and the scope of the invention is not limited thereto.

Preparation Example 1: Preparation of Polyalkylene Carbonate Resin (A1, PEC)

A polyethylene carbonate resin was prepared by copolymerizing ethylene oxide and carbon dioxide using a diethyl-zinc catalyst through the following method (Journal of Polymer Science B 1969, 287; Journal of Controlled release 1997, 49, 263).

1 g of a dry diethyl-zinc catalyst and 10 mL of a dioxane solvent were introduced into an autoclave reactor equipped with a stirrer, and then 0.1 g of diluted purified water was added to 5 ml of dioxane solvent while stirring slowly.

Subsequently, carbon dioxide was charged in the reactor to a pressure of about 10 atm, and then the solution was stirred at 120° C. for 1 hour. Then, 10 g of purified ethylene oxide was added, carbon dioxide was again charged to a pressure of about 50 atm, and then temperature was adjusted to 60° C. and the reaction was performed for about 48 hours, After the reaction, unreacted ethylene oxide was removed under low pressure, and the reaction product was dissolved in a dichloromethane solvent. Then, the dissolved reaction product was washed with an aqueous hydrochloric acid solution (0.1 M), and then precipitated with a methanol solvent to obtain a polyethylene carbonate resin. The amount of the obtained resin was about 15 g, the formation thereof was observed b nuclear magnetic resonance spectroscopy, and it was confirmed that the weight average molecular weight thereof analyzed by gel permeation chromatography (GPC) was 160,000 g/mol.

Polylactide (NatureWorks PLA 3001D) was mixed with the polyethylene carbonate prepared above to prepare pellets so that the content of polylactide was 5 wt %.

Preparation Example 2: Preparation of Polyketone Resin (B1, PK)

Polyketone (Hyosung, M620A) pellets were used, and MI of the ketone resin was 6.

Example 1

Polyketone resin Hyosung, M620A 20% was uniformly mixed with the polyethylene carbonate resin 80% (containing 5 wt % of NatureWorks PLA 3001 D) and dried in a vacuum oven at 40° C. for 12 hours. A T-die film producing device was attached to a twin-screw extruder and the resultant product was extruded at about 165° C. to 185° C. to prepare a 20 mm T-die film.

Example 2 and Comparative Examples 1 to 3

A T-die film was prepared in the same manner as in Example 1, except for that the components and content shown in Table 1 below were used. For the C1 used in Comparative Example 2, NatureWorks 4032D was used as the PLA resin.

TABLE 1

| | Category | | |
|---|---|---|---|
| | Polyalkylene carbonate resin (component/content (wt %)) | Polyketone resin | Other resin (component/content (wt %)) |
| Example 1 | A1/80 | B1/20 | — |
| Example 2 | A1/90 | B1/10 | — |
| Comparative Example 1 | A1/100 | — | — |
| Comparative Example 2 | A1/80 | — | C1/20 |
| Comparative Example 3 | A1/50 | B1/50 | — |

Experimental Method

Experimental Example 1

For the films produced according to Examples and Comparative Examples, the tear strength, tensile strength and elongation were measured by the following method using UTM (Universal Testing Machine, Instron). The results are shown in Table 2 below.

1) Internal tearing strength (kg/cm) was measured according to ASTM D1004-03, and the average value of 5 tests in total was measured as the result value.

2) Tensile strength (TS max, kgf/cm$^2$) was prepared by dumbbell-shaped specimens according to ASTM D638, and then the tensile strength was measured at a rate of 50 mm/min. The average value of 5 tests in total was measured as the result value.

Elongation (%) was measured by measuring the elongation until the specimen was cut under the same tensile strength condition and is the average value result from a total of 5 tests.

Experimental Example 2

Figure 2:
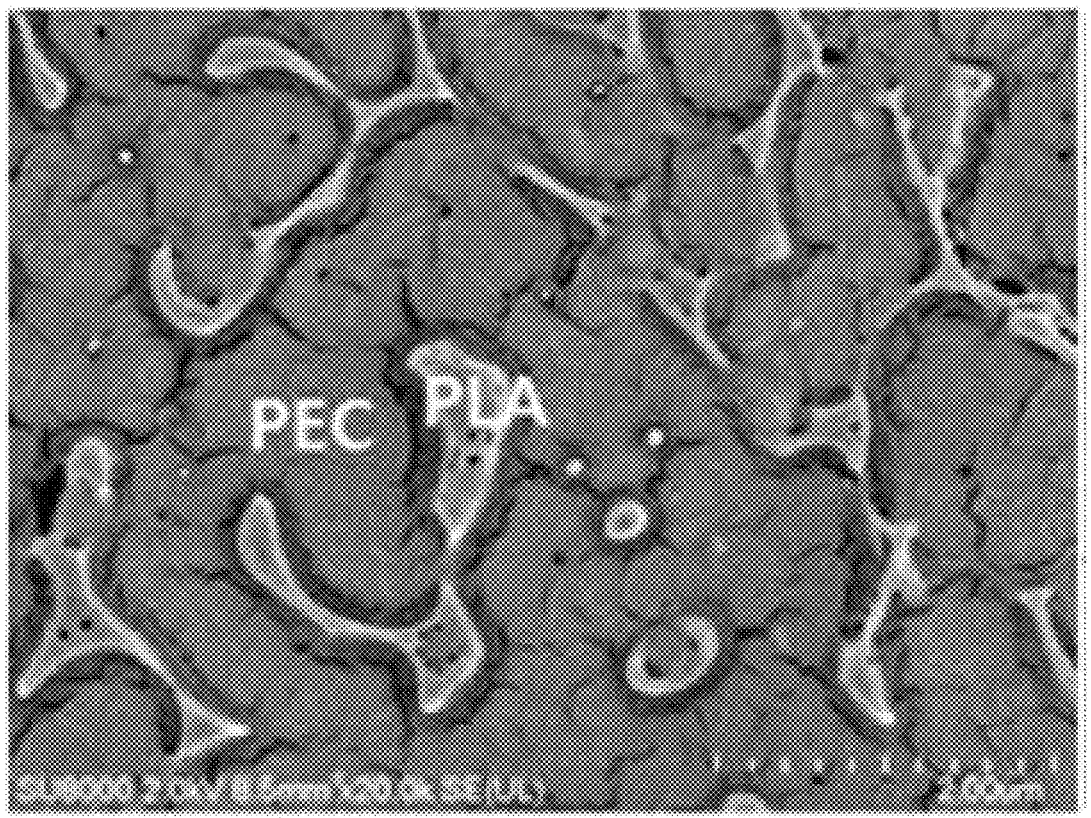
FIG. 2 is a SEM photograph of a film specimen according to Comparative Example 2.

In the producing processes of Example 1 and Comparative Example 2, a strand was produced using a die in a twin-screw extruder. SEM images of the prepared strand were taken to confirm a domain shape of the blend resin. The results are shown in FIGS. 1 and 2.

TABLE 2

| | Category | | |
|---|---|---|---|
| | Tensile strength(kgf/cm$^2$) | Elongation (%) | Tear strength(kg/cm) |
| Example 1 | 277 | 417 | 63 |
| Example 2 | 220 | 502 | 54 |
| Comparative Example 1 | 88 | 806 | 25 |
| Comparative Example 2 | 167 | 283 | 45 |
| Comparative Example 3 | Film production is impossible. | Film production is impossible. | Film production is impossible |

Referring to Table 2, it can be confirmed that in the case of Example 1 where PEC and PK are mixed and used within the range of the content according to the present invention, it can realize remarkably excellent mechanical properties (tensile strength and tear strength) as compared with Comparative Examples. In particular, it can be confirmed that excellent tensile strength and tear strength are achieved within the elongation range of 300% to 500%, which is a proper elongation range required for an industrial packaging film.

It can be confirmed that in the case of Comparative Example 1 in which only PEC was used alone, the elongation properties are 806%, very excellent, but the tensile strength and tear strength are significantly lower than those of Examples, and that in the case of Comparative Example 2 in which the PEC and the PLA resin are mixed and used, the elongation properties are remarkably deteriorated, and thus both Comparative Examples 1 and 2 are not suitable for industrial packaging materials.

In the case of Comparative Example 2, it is a conventional technique in which PLA is combined to complement the physical properties of PEC. Referring to the image of FIG. 2, it can be confirmed that the compatibility is lowered and a clear interface exists. When the compatibility is lowered, the respective physical properties of the blend resin are expressed intactly when applied to the product, and thus there is a problem that each other's physical properties cannot be sufficiently complemented.

However, referring to the SEM image of FIG. 1, it can be confirmed that in the case of Example 1, compatibility of PEC and PK are excellent and thus the interface is unclear. As a result, it can be confirmed that the effect of complementing the physical properties between the two resins is excellent.

In the case of Comparative Example 3, as the content of PK increases, PK pellet does not dissolve in an extruder temperature range (about 165° C. to 185° C.) for PEC film production due to high Tm of PK (Tm=200° C.), and therefore normal film production is impossible. Further, when the temperature of the extruder is increased to melt the PK, PEC resin is thermally decomposed and the film itself cannot be produced.

The invention claimed is:

1. A polyalkylene carbonate-based film comprising:
a blend resin in which 75 to 99% by weight of a polyalkylene carbonate resin and 1 to 25% by weight of a polyketone resin are mixed,
wherein the polyalkylene carbonate-based film has a tensile strength of 200 kgf/cm² to 300 kgf/cm² as measured by ASTM D 638, and
wherein the polyalkylene carbonate resin includes a repeating unit represented by Chemical Formula 1:

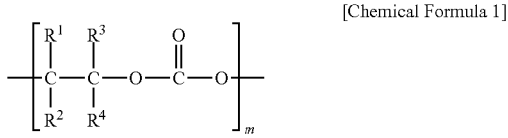

[Chemical Formula 1]

wherein, in Chemical Formula 1, $R^1$ to $R^4$ are each independently hydrogen, a linear or branched alkyl group having 1 to 20 carbon atoms, an aryl group having 6 to 20 carbon atoms, an alkenyl group having 2 to 20 carbon atoms or a cycloalkyl group having 3 to 20 carbon atoms, at least two of $R^1$ to $R^4$ may be connected to each other to form a cycloalkyl group having 3 to 10 carbon atoms, and m is an integer of 10 to 1,000.

2. The polyalkylene carbonate-based film according to claim 1, wherein the blend resin is prepared by mixing 80 to 90% by weight of a polyalkylene carbonate resin and 10 to 20% by weight of a polyketone resin.

3. The polyalkylene carbonate-based film according to claim 1, wherein the polyalkylene carbonate resin is at least one selected from the group consisting of a polyethylene carbonate resin, a polypropylene carbonate resin, a polypentene carbonate resin, a polyhexene carbonate resin, a polyoctene carbonate resin, a polycyclohexene carbonate resin, and a copolymer resin thereof.

4. The polyalkylene carbonate-based film according to claim 1, wherein the polyalkylene carbonate resin has a weight average molecular weight of 50,000 g/mol to 500,000 g/mol.

5. The polyalkylene carbonate-based film according to claim 1, wherein the polyketone resin includes a repeating unit represented by the following Chemical Formula 2:

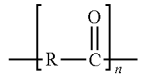

[Chemical Formula 2]

wherein, in Chemical Formula 2,
R is a linear or branched alkylene having 1 to 10 carbon atoms; an arylene having 6 to 30 carbon atoms; an alkyl ether having 1 to 10 carbon atoms; an aryl ether having 6 to 30 carbon atoms; an alkyl ester having 1 to 10 carbon atoms; or an aryl ester having 6 to 30 carbon atoms, and
n is an integer of 10 to 1,000.

6. The polyalkylene carbonate-based film according to claim 1, wherein the polyketone resin is an aliphatic polyketone resin containing ethylene, propylene, isopropylene, or butylene units.

7. The polyalkylene carbonate-based film according to claim 1, wherein the polyketone resin is a binary copolymer or a ternary copolymer.

8. The polyalkylene carbonate-based film according to claim 1, wherein the polyketone resin has a weight average molecular weight of 10,000 to 1,000,000 g/mol.

9. The polyalkylene carbonate-based film according to claim 1, wherein the polyketone resin has a melt index (MI) of 3 to 8 g/10 min.

10. The polyalkylene carbonate-based film according to claim 1, wherein an internal tearing strength of the polyalkylene carbonate-based film according to ASTM D 1004-03 is 50 kg/cm to 80 kg/cm.

11. The polyalkylene carbonate-based film according to claim 1, wherein an elongation of the polyalkylene carbonate-based film according to ASTM D 638 is 300% to 500%.

12. The polyalkylene carbonate-based film according to claim 1, wherein the blend resin further comprises a polylactide resin, wherein the polylactide resin is included in an amount of 1 to 30 parts by weight, relative to 100 parts by weight of the polyalkylene carbonate resin.

* * * * *